(12) United States Patent
Mazgaj et al.

(10) Patent No.: US 6,612,047 B1
(45) Date of Patent: Sep. 2, 2003

(54) LENGTH MEASURING DEVICE

(75) Inventors: Mark Mazgaj, Lakewood, NY (US); Helmut Welker, Jamestown, NY (US)

(73) Assignee: Acu-Rite, Inc., Jamestown, NY (US)

( * ) Notice: Subject to any disclaimer, the term of this patent is extended or adjusted under 35 U.S.C. 154(b) by 0 days.

(21) Appl. No.: 10/079,047

(22) Filed: Feb. 19, 2002

(51) Int. Cl.⁷ ................................................ G01B 9/00
(52) U.S. Cl. ........................ 33/706; 33/707; 33/708; 33/702; 33/703
(58) Field of Search .................. 33/706, 707, 708, 33/702, 703

(56) References Cited

U.S. PATENT DOCUMENTS

| | | | |
|---|---|---|---|
| 3,899,255 A | * 8/1975 | Meier | 33/707 |
| 4,295,742 A | * 10/1981 | Nelle et al. | 33/707 |
| 4,320,578 A | * 3/1982 | Ernst | 33/702 |
| 4,509,262 A | * 4/1985 | Nelle | 33/707 |
| 4,534,113 A | * 8/1985 | Holstein | 33/707 |
| 4,631,403 A | * 12/1986 | Rieder et al. | 33/707 |
| 5,029,401 A | * 7/1991 | Masom | 33/705 |
| 5,551,163 A | 9/1996 | Affa | |
| 5,832,616 A | * 11/1998 | Fiedler | 33/706 |
| 5,987,768 A | * 11/1999 | Freitag et al. | 33/706 |
| 6,145,213 A | * 11/2000 | Shimano et al. | 33/702 |
| 6,163,974 A | * 12/2000 | Masek et al. | 33/706 |
| 6,349,481 B1 | * 2/2002 | Nelle | 33/702 |
| 6,442,861 B1 | * 9/2002 | Boge et al. | 33/706 |

FOREIGN PATENT DOCUMENTS

| | | | |
|---|---|---|---|
| DE | 35 09 390 | 11/1985 | |
| DE | 4341191 A1 | * 6/1995 | G01B/7/02 |
| DE | 44 06 798 | 9/1995 | |
| DE | 25 05 587 | 8/1996 | |

* cited by examiner

Primary Examiner—Diego Gutierrez
Assistant Examiner—Amanda J Hoolahan
(74) Attorney, Agent, or Firm—Brinks Hafer Gilsonthrone

(57) ABSTRACT

A length measuring device for determining a relative position of two objects, which can be moved relative to each other. The measurement device, includes a carrier body which supports the measurement device and is connected with a contact area with a mounting area of one of the two objects and with a scanning arrangement connected with another one of the two objects and scanning the measurement device along a measurement direction. Wherein a torque on an end face of the carrier body in the measurement direction acts on the carrier body in such a way that the contact area of the carrier body is pressed against the mounting area.

31 Claims, 4 Drawing Sheets

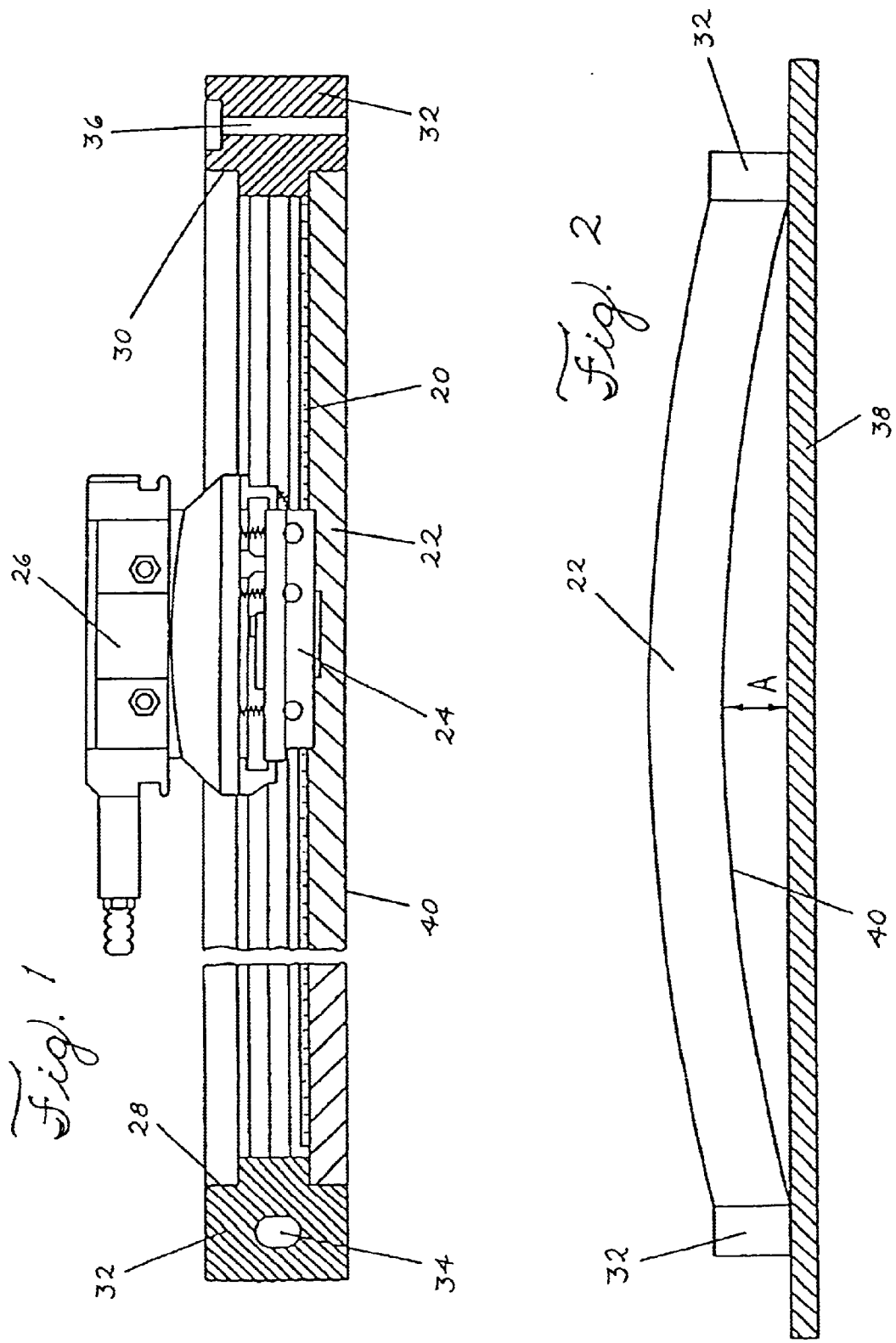

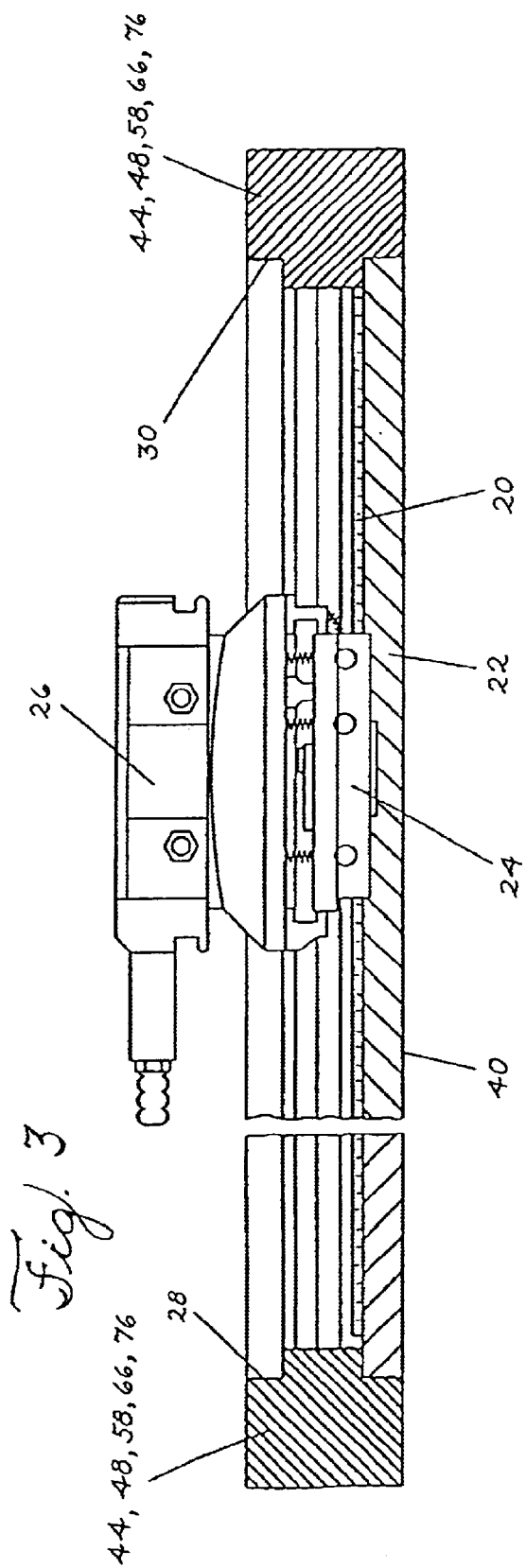
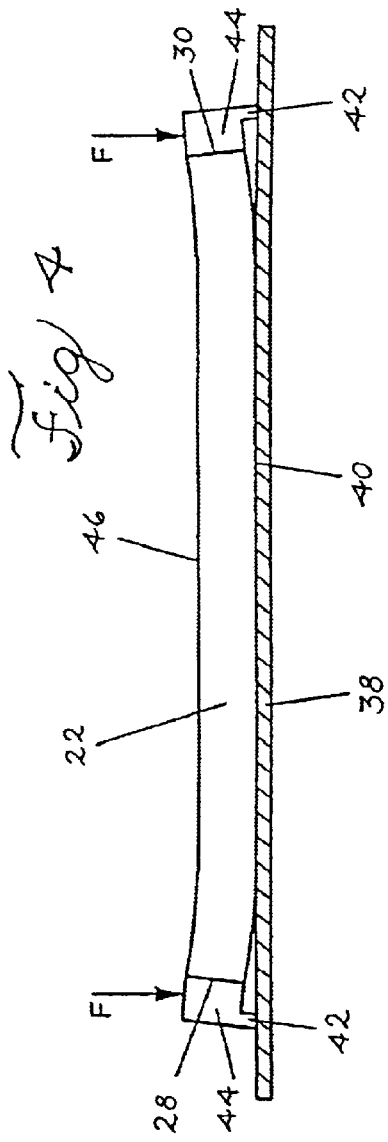

LENGTH MEASURING DEVICE

BACKGROUND OF THE INVENTION

1. Field of the Invention

The present invention relates to a length measuring device.

2. Discussion of Related Art

Length measuring devices for determining the relative position between two objects which can be moved relative to each other are, for example, used for recording the position of linear axes without additional mechanical transfer elements in machine tools or in co-ordinate measuring machines. They include a measurement device and a scanning arrangement, which scans the measurement device as well as a carrier body, which supports the measurement device. Depending upon the conditions of application there is a distinction between open or sealed length measuring devices. Open length measuring devices are used where there is little or no contamination whereas sealed length measuring devices are preferably used on machines and installations with rough conditions of application with regard to contamination wherein an aluminum casing protects the measurement device and the scanning arrangement as well as the guide of the scanning arrangement from filings, dust and spray.

In order to maintain high measurement precision it is necessary for the length measuring device to follow the changes in length of the objects moved relative to each other caused by temperature changes. Furthermore, self-oscillations of the longitudinal measuring device, which can arise in certain circumstances due to oscillations on the objects moved, must be suppressed. If, for example, the length measuring device is used on a machine tool the oscillations occurring on the machine tool are transferred from the machine tool to the length measuring device. If the carrier body of the open or sealed length measuring device is connected at the ends only with one of the objects, as is in particular the case with shorter length measurements, where the middle area is not supported and tends to oscillate with its own resonance frequency when the object's mounting area oscillates. These oscillations are transferred to the measurement device and can amongst other things lead to a situation wherein the scanning arrangement loses contact with the measurement device, which can lead to incorrect measurements.

In the same way, the absence of contact of larger areas of the contact area of the carrier body to be connected to the mounting area of an object leads to poor thermal connection so that temperature-dependent changes in length of the object do not lead to adequate changes in length of the carrier body.

A further problem is that carrier bodies manufactured from an aluminum profile have no preferred orientation for deformation or twisting in such a way that with front fixing of a carrier body on the mounting area of an object the contact area of the carrier body is either pressed against the mounting area, lies plane parallel against it or is directed away from the mounting area. In the latter two cases there is a danger of the carrier body not following the mechanical and thermal changes of the object and showing its own dynamic characteristics with regard to oscillations and thermally dependent changes in length.

From DE 25 05 587 C3, a length measuring device is known wherein a carrier body is fixed at the ends with fixing elements formed in a jointed way on one of the objects which can be moved relative to each other wherein the carrier body lies free between the fixing elements in such a way that oscillations are facilitated which influence the measurement precision in a disadvantageous way.

In order to suppress self-oscillations and to improve the temperature pattern of the carrier body it is known that additional securing devices can be distributed in the middle or over the length of the carrier body and the contact of the support area of the carrier body with the mounting area of the object is thereby strengthened. Screws, fixing clamps or adhesive substances are used as securing devices.

From DE 35 09 390 A1, a length measuring device is known wherein as an addition to the elastic fixing elements at the ends of the measuring device casing further fixing elements are arranged which are however fixed at a distance from the object to be measured in such a way that oscillations can likewise occur which lead to measurement errors. Furthermore, this step for strengthening the contact between the support area of the carrier body and the mounting area of one of the objects requires additional securing devices and therefore higher manufacturing costs as well as greater manufacturing resources in the connection of the length measuring device with the objects which are moved relative to each other. In addition, more space is needed to apply the additional securing device but such space is not available in many applications.

From DE 44 06 798 C2, a position measuring device is known wherein the measurement device is fixed on a carrier body which is fixed rigidly at one point and at least at one further point via elastic elements for translational bearing of the carrier body to one of the objects and is supported at least with a surface area on one of the objects. A highly elastic layer made from an adhesive layer with an anti-friction layer applied thereto is provided in this support area running in the measurement direction between the area of the carrier body and a mounting area of the object running parallel thereto. This step for improving the contact between the contact area of the carrier body and the mounting area of one of the two objects, which can be moved relative to each other does however require increased manufacturing and assembly resources.

Another example of a known length measuring device is shown in FIG. 1. The length measuring device records the position of two objects which can be moved relative to each other, for example for the measurement of the carriage displacement on a machine tool. The length measuring device has a measurement device 20 in the form of a gauge, which is fixed in a carrier body 22, which includes, for example, an extruded aluminum profile or aluminum profile produced in a die-casting process. A photo-electric or magnetic sensor arranged in a scanning carriage 24 of a scanning arrangement 26 scans the measurement device 20. The carrier body 22 and therefore the measurement device 20 are connected with one of the two objects which can be moved relative to each other whereas the scanning arrangement 26 is connected with the other one of the two objects in such a way that a relative change in position of the two objects is recorded.

In the example shown in FIG. 1, the carrier body 22 is closed at its front ends 28, 30 by end pieces 32 which are inserted in a shape-locking way in the profile of the carrier body 22. In the end pieces 32, oblong holes 34 or bores 36 perpendicular to the measuring direction, i.e. perpendicular to the length of the measurement device 20, are arranged. The oblong hole 34 is parallel to the plane of the measurement device 20 or perpendicular hereto as a bore 36. Fixing screws are put through the oblong hole 34 or the bore 36 and screwed with corresponding threads in the mounting area of one of the two objects in such a way that a secure connection is produced between the carrier body 22 and the mounting area.

FIG. 2 shows a schematic side view of an end-side connection of the carrier body 22 with the mounting area 38 through a force-locking or shape-locking connection of the front ends of the carrier body 22 with the mounting area 38 by end pieces 32.

With this form of connection, poor contact of the contact area 40 of the carrier body 22 with the mounting area 38 can arise in particular with drawn carrier bodies or carrier bodies produced in the extrusion press process for sealed length measuring devices in such a way that particularly in the middle area of the carrier body 22 the contact area 40 and the mounting area 38 are moved away from each other by the value A. This poor contact leads to the problems explained at the outset with the consequent incorrect measurements and determination of positions which are avoided by the solution according to the present invention.

OBJECTS AND SUMMARY OF THE INVENTION

It is an object of the present invention to provide a length measuring device of the type mentioned at the outset which when arranging the carrier body on the mounting area of an object ensures optimum contact of the carrier body with the mounting area without additional securing devices and without additional resources and space requirements.

This object is achieved according to the present invention through a length measuring device for determining a relative position of two objects, which can be moved relative to each other. The measurement device, includes a carrier body which supports the measurement device and is connected with a contact area with a mounting area of one of the two objects and with a scanning arrangement connected with another one of the two objects and scanning the measurement device along a measurement direction. Wherein a torque on an end face of the carrier body in the measurement direction acts on the carrier body in such a way that the contact area of the carrier body is pressed against the mounting area.

The solution according to the present invention creates optimum contact of the carrier body with the mounting area of one of the two objects, which can be moved relative to each other without additional securing devices and additional resources and space being necessary for arranging the carrier body on the mounting area of the object. The temperature and oscillation pattern of the length measuring device is therefore improved without increasing the manufacturing and assembly resources and therefore the costs of manufacturing and assembly.

The basis of the present invention is the recognition that a large-area contact of a carrier body connected at its front ends with the mounting area of an object can also be achieved in that at the front ends of the carrier body in the measuring direction a torque engages which produces a tight contact between a large part of the contact area of the carrier body and the mounting area of an object in the connection of the length measuring device with the objects which can be moved relative to each other.

The torque for large-area and tight contacting of the contact area with the mounting area of one or both of the two objects, which can be moved relative to each other, can be realized in difference ways.

A preferred embodiment includes a lever and a force producing the torque and working at a distance from the front end of the carrier body on the carrier body with which a large-area contact between the contact area of the carrier body and the mounting body of one of the two objects which can be moved relative to each other is produced.

Through the arrangement of a lever and the working of a force on the ends of the length measuring device the introduction of the torque for a large-area connection of the carrier body with the mounting area of the object is displaced into an area in which even with tight incorporation conditions perpendicularly to the measuring direction sufficient space is available which can work over the entire breadth of the carrier body which is preferably profiled.

The lever preferably includes a shoulder oriented to the mounting area of one of the objects and the force working on the carrier body is a tension element arranged on the side of the shoulder turned away from the front end.

Through a connection of the tension element with the mounting area of one of the objects the connection of the carrier body to the mounting area can be combined with the production of a torque, which reduces the manufacturing and assembly resources and therefore additionally the costs and ensures large-area positioning of the contact area in the middle area and a connection in the end areas of the contact area of the carrier body.

The shoulders are preferably integrated into end pieces which cover the front side of the carrier body and with which the casing of the length measuring device is closed at the end and with which the length measuring device is connected to the mounting area in particular by means of a screw connection.

The formation of the shoulder for producing the lever effect in connection with the tension element can be achieved in different ways.

In a first embodiment, the end piece covering the front side of the carrier body has a ledge projecting over the surface area of the carrier body lying against the mounting area and a screw connection between the carrier body or the end piece and the mounting area of one of the objects arranged at a small distance to the end piece.

The connection of the end piece with the carrier body can take place in a force-locking or in particular shape-locking way in such a way that the end piece has an insertion for inserting the end piece in a front opening of the carrier body/can be inserted perpendicularly to the measuring direction in the carrier body.

Alternatively, the shoulder can be realized by an end piece covering the front side of the carrier body and having a slightly angular mounting surface, which connects flush to the front cross-section of the carrier body and widens to the end of the end piece turned away from the front side of the carrier body. In association with a screw connection arranged at a small distance from the end piece between the carrier body or the end piece and the mounting area of one of the two objects which can be moved relative to each other, a simple lever arrangement is created which ensures large-area contact between the contact area of the carrier body and the mounting area.

A further possibility for realizing a shoulder of the front end of the carrier body includes arranging a web or several shoulders arranged beside one another perpendicularly to the measuring direction for example in the form of pinheads in the end area of the contact area of the carrier body which is to lie against the mounting area and providing at a small distance from the web or the shoulders screw connections as securing devices which connect the carrier body to the mounting area.

Example embodiments shown in the drawings are intended to clarify the principle according to the invention and possibilities for realizing the functional principle forming the basis of the invention. The drawings show:

BRIEF DESCRIPTION OF THE DRAWINGS

FIG. 1 schematically shows an embodiment of a known sealed length measuring device;

FIG. 2 schematically shows a well known manner of fixing a carrier body at the end side on a mounting surface of the sealed length measuring device of FIG. 1;

FIG. 3 schematically shows an embodiment of a sealed length measuring device in accordance with the present invention that can employ the various embodiments of carrier bodies and end pieces shown in FIGS. 4–14;

FIG. 4 schematically shows a side view of an embodiment of a contact area of the carrier body of the sealed length measuring device of FIG. 3 in accordance with the present invention brought through influence of a torque at the front ends of the carrier body in the measuring direction in the middle area to lie against a mounting area in a fixed way;

DETAILED DESCRIPTION OF THE PREFERRED EMBODIMENTS

Figure 5:
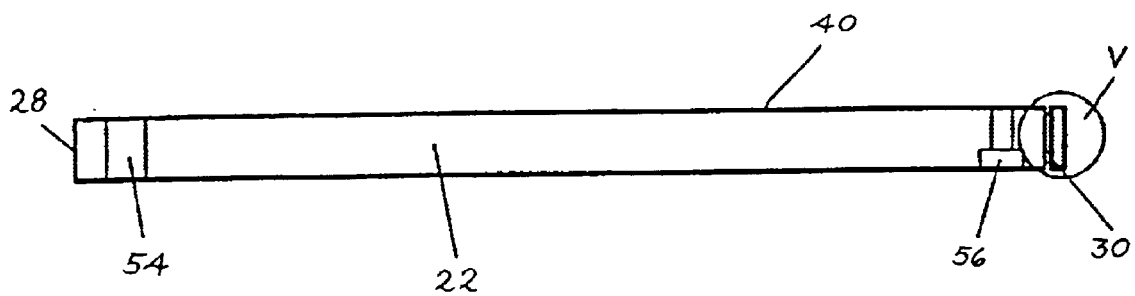
FIG. 5 shows a top view of a second embodiment of a carrier body with front end pieces with projecting positioning collars in accordance with the present invention.

A length measuring device in accordance with the present invention is shown in FIG. 3. The length measuring device records the position of two objects which can be moved relative to each other, for example for the measurement of the carriage displacement on a machine tool. The length measuring device has a measurement device 20 in the form of a gauge, which is fixed in a carrier body 22, which includes, for example, an extruded aluminum profile or aluminum profile produced in a die-casting process. A photo-electric or magnetic sensor arranged in a scanning carriage 24 of a scanning arrangement 26 scans the measurement device 20. The carrier body 22 and therefore the measurement device 20 are connected with one of the two objects which can be moved relative to each other whereas the scanning arrangement 26 is connected with the other one of the two objects in such a way that a relative change in position of the two objects is recorded.

As shown in FIG. 3, the carrier body 22 is closed at its front ends 28, 30 by various embodiments of end pieces 44, 48, 58, 66 and 76 which are inserted in a shape-locking way in the profile of the carrier body 22. These end pieces will be discussed below.

FIG. 4 shows a schematic representation of the principle of the solution which ensures that the contact area 40 of the carrier body 22 is connected fully with the mounting area 38 through the application of a torque at the ends of the carrier body 22 over a large surface area which in particular covers the middle area of the length measuring device.

For this purpose, a directed torque from the front ends 28, 30 of the carrier body 22 is exerted on the carrier body 22 which presses the contact area 40 of the carrier body 22 against the mounting area 38. The torque is produced by a lever arranged on or in proximity to the front ends 28, 30 of the carrier body 22 and a compressive force or tension F, which engages at a given distance from the lever on the carrier body 22 in such a way that the resulting torque forces the contact area 40 of the carrier body 22 against the mounting area 38. The lever is formed by shoulders 42 standing away from the contact area 40 of the carrier body 22 and shoulders 42 arranged on or in immediate proximity to the front ends 28, 30 of the carrier body 22 while the tension forces F engage at a greater distance from the front ends 28, 30 of the carrier body 22 than the shoulders 42 on the carrier body 22. With a sufficiently great tension F, a small distance of the force engagement point from the shoulders 42 is sufficient to ensure the desired large-area positioning of the contact area 40 against the mounting area 38.

In the schematic representation according to FIG. 4, torque values on both front ends 28, 30 of the carrier body 22 work on the carrier body 22 but the solution according to the present invention can also be used in principle for applying a torque on only one front end 28 or 30 of the carrier body 22 while the other front end is connected in another way with the mounting area 38, for example without a lever and only through applying tension.

FIG. 4 shows the arrangement of shoulders 42 on end pieces 44 which are connected in a force-locking or shape-locking way with the front ends 28, 30 of the carrier body 22 and therefore simultaneously cover the open profile of the carrier body 22. Alternatively, the shoulders 42 can be arranged directly in the area of the front ends 28, 30 of the carrier body 22 on the contact area 40 and the possibly open front sides of the carrier body 22 can be closed with covering caps.

In the schematic representation in FIG. 4, the tension F acts on the top surface 46 lying opposite the contact area 40 on the carrier body 22. It can be applied either by tension and/or securing devices acting in this direction which connects the carrier body 22 to the mounting area 38 or by a pre-tension and a securing means ensuring the pre-tension placed perpendicularly hereto through the side areas of the carrier body 22 or the end pieces 44.

Various embodiments of lever and force devices for producing torque and their combination with securing means for arranging the carrier body 22 on a mounting area 38 are shown in the FIGS. 5 to 14 and are to be explained in greater detail below.

Figure 6:
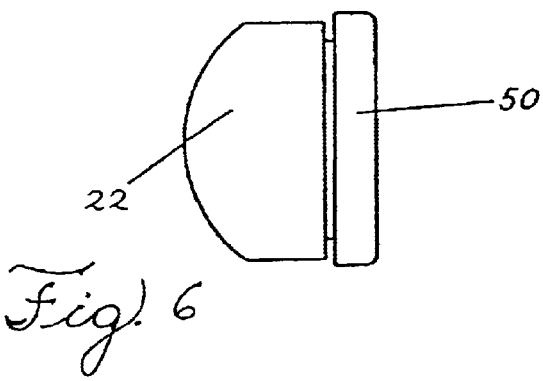
FIG. 6 shows an enlarged representation of the end area V of the carrier body according to FIG. 5.

The embodiment shown in FIGS. 5 to 8 has end pieces 48 which are inserted in the front ends 28, 30 of the carrier body 22 and have an end shoulder 50 which at least on the side of the contact area 40 of the carrier body 22 project over the plane of the contact area 40. FIG. 6 illustrates, via an enlarged representation of section V according to FIG. 5, the proportions of the carrier body 22 and the end shoulders 50 of the end piece 48 and shows that the end shoulders 50 must only project slightly over the outer areas of the carrier body 22 in order to produce the desired torque.

Figure 7:
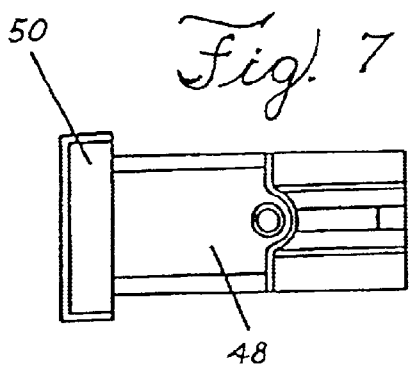
FIG. 7 shows a top view of an embodiment of an end piece to be inserted in the profiled carrier body according to FIG. 5.
Figure 8:
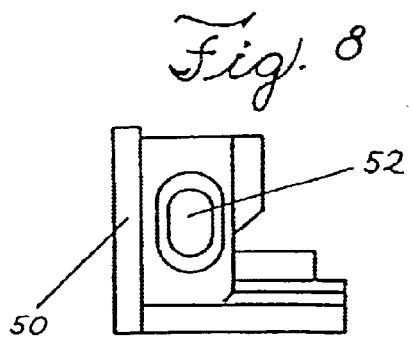
FIG. 8 shows a side view of the end piece according to FIG. 7.

In FIGS. 7 and 8, the end piece 48 is shown in a top view and in a side view. These show the arrangement of an oblong hole bore 52 which is aligned with bores 54, 56 provided in the carrier body 22 and facilitates tolerance compensation upon insertion of a fixing screw in the bores 52, 54, 56 aligned with each other. Through tightening the fixing screws inserted in the aligned bores 52, 54, 56 and screwing with a thread provided in the mounting area tension is produced at a small distance from the end shoulders 50 of the end pieces 48 which with the resulting lever effect presses the contact area 40 in a large area against the mounting area of the object to be connected with the carrier body 22. By the fixing screws therefore both the tension required for the lever effect for the production of torque is produced and the fixing of the carrier body 22 on the mounting area is brought about.

Figure 9:
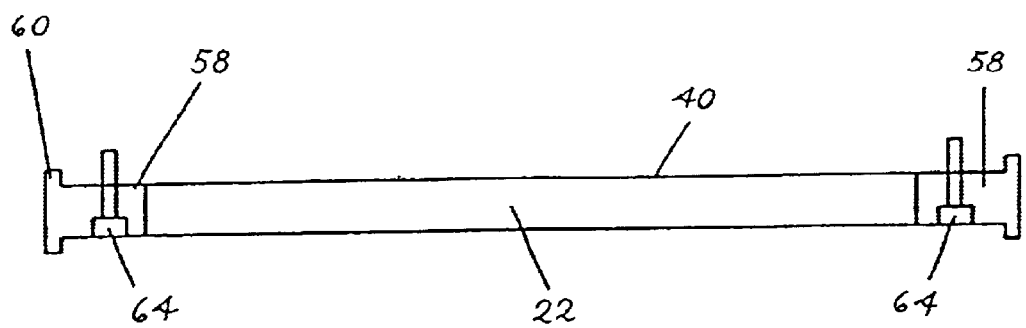
FIG. 9 schematically shows a third embodiment of a carrier body with end pieces on both sides with shoulders and mounts for securing devices in accordance with the present invention.
Figure 10:
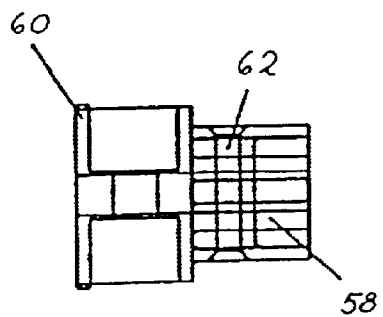
FIG. 10 shows a detailed representation of the end piece according to FIG. 9.

While in the embodiment according to FIG. 5 bores 54, 56 for receiving fixing screws are provided in the carrier body 22, these bores are not present in the embodiment according to FIGS. 9 and 10 in which end pieces 58 are provided which like the end pieces 58 according to FIGS. 5 to 8 have a shoulder 60 and contain bores 62 for receiving fixing screws 64.

Figure 11:
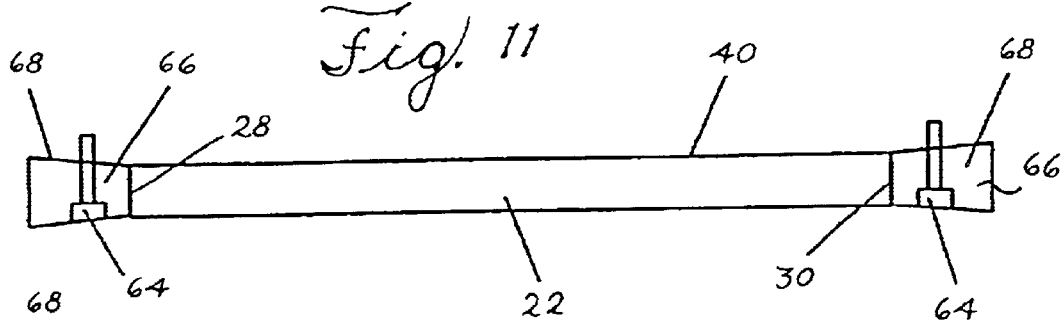
FIG. 11 schematically shows a fourth embodiment of a carrier body with slightly angular end pieces in accordance with the present invention.
Figure 12:
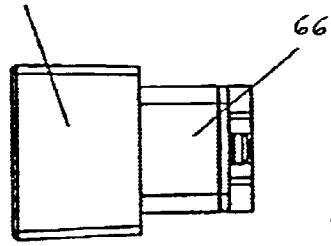
FIG. 12 shows a detailed representation of the end pieces according to FIG. 11.

In FIGS. 11 and 12 a further embodiment for producing a torque by a lever and a stamped force is shown which includes an end piece 66 in connection with a fixing screw 64 wherein the end pieces 66 which can be inserted in the ends of the carrier body 22 have a slightly angular mounting surface 68 which widens continuously from the connection to the front ends 28, 30 of the carrier body 22 to the front end of the end pieces 66. In association with the fixing screw 64, which can likewise be inserted in a bore of the end piece 66, the desired lever effect is produced which presses the contact area 40 of the carrier body 22 against the mounting area.

Figure 13:
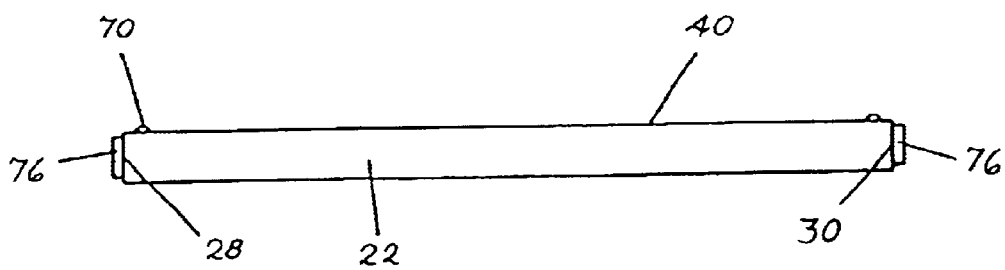
FIG. 13 schematically shows a fifth embodiment of a carrier body with pinheads allowed in the end areas in accordance with the present invention.
Figure 14:
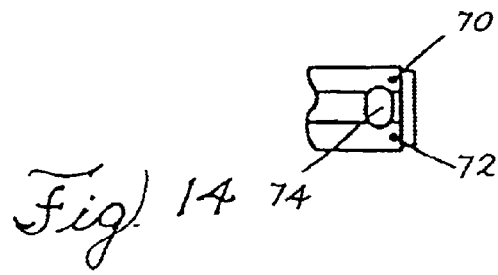
FIG. 14 is a top view of an end area of the carrier body according to FIG. 13.

In FIGS. 13 and 14 an embodiment is shown wherein the shoulder is directly integrated in the front end area of the carrier body 22 in the form of pinheads 70, 72 which are arranged between the front ends 28, 30 and an oblong hole opening 74 on the side of the contact area 40 of the carrier body 22. A tensioning device in the form of a fixing screw put through the oblong hole opening 74 ensures with the corresponding tension the realization of the lever effect which presses the contact area 40 of the carrier body 22 against the mounting area and which is necessary for realizing the principle according to the present invention. The open, front ends 28, 30 of the carrier body 22 are closed in this embodiment with end caps 76.

Instead of two pinheads 70, 72 arranged at a distance from each other, a through web can also be provided between the oblong hole opening 74 and the front end 28/30 of the carrier body 22 which in the same way as the pinheads 70, 72, realizes a shoulder and in association with the contact force of a fixing screw as well as the resulting lever effect presses the contact area 40 against the mounting area of one of the two objects which can be moved relative to each other.

The foregoing description is provided to illustrate the invention, and is not to be construed as a limitation. Numerous additions, substitutions and other changes can be made to the invention without departing from its scope as set forth in the appended claims.

We claim:

1. A length measuring device for determining a relative position of two objects, which can be moved relative to each other, said length measuring device comprising:
   a carrier body which supports a measurement device and comprises a contact area contacting a mounting area of one of said two objects; and
   a scanning arrangement connected with another one of said two objects and scanning said measurement device along a measurement direction;
   wherein a torque on an end face of said carrier body in said measurement direction acts on said carrier body in such a way that said contact area of said carrier body is pressed against said mounting area.

2. The length measuring device according to claim 1, further comprising a lever and a force producing said torque and acting at a distance from said end face.

3. The length measuring device according to claim 2, wherein said lever comprises a shoulder oriented to said mounting area and said force acting on said carrier body comprises a tensioning device arranged on a side of said shoulder turned away from said end face.

4. The length measuring device according to claim 3, wherein said tensioning device is connected to said mounting area.

5. The length measuring device according to claim 3, wherein said shoulder is arranged running perpendicularly to said measuring direction and at a given distance from said tensioning device.

6. The length measuring device according to claim 2, wherein a first end of said lever is arranged on said end face and a second end of said lever is arranged on a second end face of said carrier body.

7. The length measuring device according to claim 6, wherein said tensioning device is provided between a first shoulder and a second shoulder arranged at said end face and said second end face, respectively.

8. The length measuring device according to claim 7, wherein said tensioning device comprises a shape-locking connection.

9. The length measuring device according to claim 8, wherein said tensioning device comprises a screw connection.

10. The length measuring device according to claim 9, wherein said screw connection exists via a bore arranged in said carrier body that receives a screw and a thread arranged in said mounting area.

11. The length measuring device according to claim 7, wherein said tensioning device comprises a force-locking connection.

12. The length measuring device according to claim 11, wherein said tensioning device comprises a screw connection.

13. The length measuring device according to claim 12, wherein said screw connection exists via a bore arranged in said carrier body that receives a screw and a thread arranged in said mounting area.

14. The length measuring device according to claim 6, wherein said tensioning device is provided at a distance from said end face and said second end face.

15. The length measuring device according to claim 1, further comprising:
   an end piece that covers said end face with a collar projecting over said contact area; and a screw connection between said carrier body and said mounting area and arranged at a small distance from said end piece.

16. The length measuring device according to claim 15, wherein said end piece is connected in a shape-locking way with said carrier body.

17. The length measuring device according to claim 16, wherein said end piece comprises an insertion for inserting said end face into an opening on said end face.

18. The length measuring device according to claim 15, wherein said end piece is inserted in said carrier body perpendicular to said measuring direction.

19. The length measuring device according to claim 15, wherein said end piece has a bore for receiving a screw which is screwed into a thread of said mounting area.

20. The length measuring device according to claim 1, further comprising:
   an end piece that covers said end face with a collar projecting over said contact area; and
   a screw connection between said end piece and said mounting area and arranged at a small distance from said end piece.

21. The length measuring device according to claim 20 wherein said end piece is connected in a shape-locking way with said carrier body.

22. The length measuring device according to claim 21, wherein said end piece comprises an insertion for inserting said end face into an opening on said end face.

23. The length measuring device according to claim 20, wherein said end piece has a bore for receiving a screw which is screwed into a thread of said mounting area.

24. The length measuring device according to claim 1, further comprising:
   an end piece covering said end face of said carrier body with a slightly angular mounting surface which connects flush to a cross-section of said end face and widens to an end of said end piece turned away from said end face; and
   a screw connection between said carrier body and said mounting area and arranged at a small distance from said end piece.

25. The length measuring device according to claim 24, wherein said end piece is connected in a shape-locking way with said carrier body.

26. The length measuring device according to claim 25, wherein said end piece comprises an insertion for inserting said end face into an opening on said end face.

27. The length measuring device according to claim 1, further comprising:
   an end piece covering said end face of said carrier body with a slightly angular mounting surface which connects flush to a cross-section of said end face and widens to an end of said end piece turned away from said end face; and
   a screw connection between said end piece and said mounting area and arranged at a small distance from said end piece.

28. The length measuring device according to claim 27, wherein said end piece is connected in a shape-locking way with said carrier body.

29. The length measuring device according to claim 28, wherein said end piece comprises an insertion for inserting said end face into an opening on said end face.

30. The length measuring device according to claim 1, further comprising:
   a first shoulder and a second shoulder are positioned perpendicularly to said measuring direction at said end face; and
   a securing device positioned a small distance from said first shoulder and said second shoulder and connecting said carrier body to said mounting area.

31. The length measuring device according to claim 30, wherein said first shoulder and said second shoulder comprise at least two pinheads arranged at a distance from one another.

\* \* \* \* \*